(12) United States Patent
Kopecz et al.

(10) Patent No.: US 9,274,760 B2
(45) Date of Patent: Mar. 1, 2016

(54) ADAPTIVE DEVELOPER EXPERIENCE BASED ON PROJECT TYPES AND PROCESS TEMPLATES

(71) Applicants: Klaus Kopecz, Walldorf (DE); Oleg Koutyrine, Walldorf (DE)

(72) Inventors: Klaus Kopecz, Walldorf (DE); Oleg Koutyrine, Walldorf (DE)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 13/939,579

(22) Filed: Jul. 11, 2013

(65) Prior Publication Data
US 2015/0020042 A1 Jan. 15, 2015

(51) Int. Cl.
*G06F 9/44* (2006.01)
*G06F 9/445* (2006.01)

(52) U.S. Cl.
CPC ... *G06F 8/34* (2013.01); *G06F 8/20* (2013.01); *G06F 8/30* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 5,115,501 A * | 5/1992 | Kerr | G06F 9/4446 |
| 5,953,524 A | 9/1999 | Meng et al. | |
| 6,002,867 A * | 12/1999 | Jazdzewski | 717/105 |
| 6,851,107 B1 * | 2/2005 | Coad et al. | 717/108 |
| 6,993,710 B1 * | 1/2006 | Coad et al. | 715/202 |
| 7,620,908 B2 | 11/2009 | Klevenz et al. | |
| 7,631,006 B2 * | 12/2009 | Hagstrom | G06F 8/20 |
| 7,661,089 B2 * | 2/2010 | Cope | G06F 8/61 705/52 |
| 8,032,409 B1 * | 10/2011 | Mikurak | G06Q 10/00 705/14.39 |
| 8,281,319 B2 | 10/2012 | Kress et al. | |
| 8,290,998 B2 | 10/2012 | Stienhans et al. | |
| 8,327,351 B2 | 12/2012 | Paladino et al. | |
| 8,341,593 B2 | 12/2012 | Fildebrandt et al. | |
| 8,356,282 B1 | 1/2013 | Leippe et al. | |
| 8,402,379 B2 | 3/2013 | Barak | |
| 8,418,074 B2 | 4/2013 | Vollrath et al. | |
| 8,429,203 B2 | 4/2013 | Perez et al. | |
| 8,781,924 B2 * | 7/2014 | Bang | G06F 8/20 705/30 |
| 2002/0046394 A1 * | 4/2002 | Do | G06F 8/20 717/108 |
| 2003/0135842 A1 * | 7/2003 | Frey et al. | 717/121 |
| 2004/0109030 A1 * | 6/2004 | Farrington | G06F 9/4446 715/808 |
| 2005/0091059 A1 * | 4/2005 | Lecoeuche | H04M 1/72561 704/270.1 |
| 2006/0036651 A1 * | 2/2006 | Cope | G06F 8/61 |
| 2006/0136870 A1 | 6/2006 | Wilson et al. | |
| 2007/0067373 A1 * | 3/2007 | Higgins | G06F 11/3013 |
| 2007/0132860 A1 * | 6/2007 | Prabhu | H04N 5/232 348/231.3 |
| 2007/0168946 A1 * | 7/2007 | Drissi | G06F 8/71 717/110 |
| 2009/0300577 A1 * | 12/2009 | Bernardini | G06F 8/70 717/101 |

(Continued)

OTHER PUBLICATIONS

Theo Mandel , "The Golden Rules of User Interface Design", John Wiley & Sons , 1997 , <http://theomandel.com/wp-content/uploads/2012/07/Mandel-GoldenRules.pdf> , pp. 1-28.*

(Continued)

*Primary Examiner* — Thuy Dao
*Assistant Examiner* — Samuel Hayim
(74) *Attorney, Agent, or Firm* — Sterne, Kessler, Goldstein & Fox P.L.L.C.

(57) ABSTRACT

Disclosed herein are system, method, and computer program product embodiments for providing an adaptive application development environment (ADE). An embodiment operates by receiving a selection of either a simple or complex project type corresponding to an application development environment (ADE). One or more development tools for generating executable code are selected used on the project type. A project view, corresponding to the project type, is generated.

21 Claims, 3 Drawing Sheets

(56) References Cited

U.S. PATENT DOCUMENTS

| | | | |
|---|---|---|---|
| 2010/0185669 A1* | 7/2010 | Hall | G06F 8/33 707/773 |
| 2010/0299305 A1* | 11/2010 | Laxman | G06F 8/71 707/609 |
| 2011/0289439 A1 | 11/2011 | Jugel | |
| 2012/0198368 A1 | 8/2012 | Bornheimer et al. | |
| 2012/0227028 A1 | 9/2012 | Pun et al. | |
| 2012/0311471 A1 | 12/2012 | Bullard et al. | |

OTHER PUBLICATIONS

Derek Merril et al., "Improving Software Project Management Skills Using a Software Project Simulator", IEEE, 1997, <http://ieeexplore.ieee.org/stamp/stamp.jsp?tp=&arnumber=632676>, pp. 1-6.*

Oren Mishali et al., "Towards IDE Support for Abstract Thinking", ACM, 2008, <http://delivery.acm.org/10.1145/1380000/1370167/p9-mishali.pdf>, pp. 1-5.*

* cited by examiner

ADAPTIVE DEVELOPER EXPERIENCE BASED ON PROJECT TYPES AND PROCESS TEMPLATES

BACKGROUND

An important part of the application development process is the actual development environment available for developers to write their code. With an increasing number of available technologies and programming languages, each of which often having its own application development environment, developers are forced to overcome learning curves related not only to the new application languages, but also new development environments. Further, developers of more limited programming experience are forced to develop on an identical application development environment as more advanced developers, or vice versa. This one-size-fits-all approach not only creates undue complexity for novice developers in understanding the development environment, but also may provide undesirable simplicity for more experienced developers who may require greater flexibility in their development needs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for providing an adaptive development environment (ADE).

Figure 1:
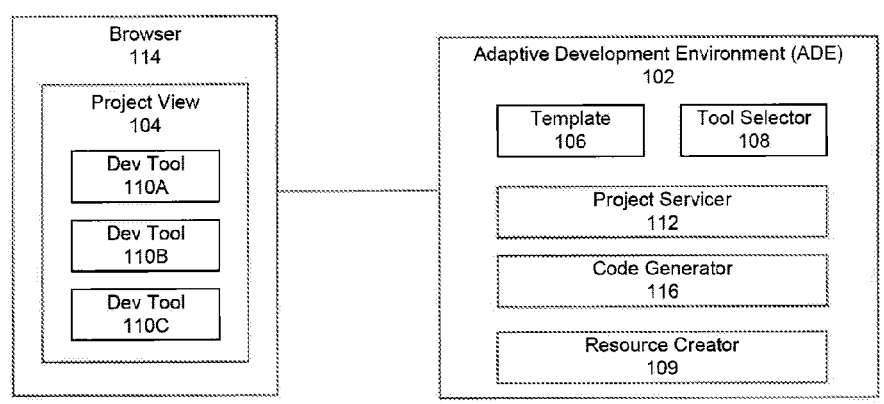
FIG. 1 is a block diagram of a system for providing an adaptive application development environment (ADE), according to an example embodiment.

FIG. 1 is a block diagram of a system 100 for providing an adaptive development environment (ADE) 102, according to an example embodiment. ADE 102 may include or generate a configurable project view 104 for application development. Project view 104 is a customizable interface used for software application development, including both network-based and non-network-based applications. ADE 102 is a backend infrastructure that may individually customize, or allow for the configuration of project view 104 based on the skill, experience, or needs of one or more application developers ("developers").

In an embodiment, a developer may access project view 104 via a browser 114, for example by entering a universal resource locator (URL) or IP address of ADE 102 into browser 114. Browser 114 may be any application used to access resources over one or more networks, such as an intranet or the Internet. Upon entering a URL into browser 114; the developer may be provided a customized or customizable project view 104 of ADE 102, and/or may be provided options for customizing project view 104. In an embodiment, project view 104 is a selected or generated user interface that is adapted to a desired development process. Project view 104 may include buttons, menu items, and/or other user interface elements that allow a developer to access or use one or more or a combination of development tools 110.

ADE 102 may prompt the developer to enter information identifying their experience, skill level, or needs with regards to application development. For example, the developer may be provided a pop-up box asking whether the developer is an experienced code writer/developer or a business analyst. ADE 102 may further inquire whether there are any specific programming languages or technologies that the developer desires to use with regard to the project. Based on the answer(s) provided by the developer, ADE 102 may select a configured template 106 corresponding to the answers.

Template 106 may be a configuration or layout of project view 104. For example, ADE 102 may include one or more templates 106 for project view 104 based on possible or anticipated answers by developers to the initial inquiries discussed above. Each template 106 may include a selection of one or more development tools 110 (dev tools 110). Templates 106 may range from simple (e.g., including as few as one dev tool 110) to more complex (e.g., including more dev tools 110 or otherwise allowing for greater configuration of project view 104 or application development features).

Dev tools 110 may be tools or features of a development environment commonly used by application developers of varying skill or experience levels. Dev tool 110 may include a set of program logic to perform a set of actions in a development environment. Dev tool 110 may include a definition of visual representation of its launching action (e.g., clickable button or menu entry) from project view 104. In an embodiment, dev tools 110 may include options for automated processing or individualized configuration of one or more aspects of the project development process. Dev tools 110 may be programming-language specific (such as an editor particularly suited for HTML code), or may be more universal in nature (such as an option to specify the security permissions associated with accessing or editing source code).

Example dev tools 110 include, but are not limited to, a tool that allows a developer to select specific programming-languages/technologies to be used with the application development process (e.g., HMTL, Javascript, Java, C++, Ruby), a tool that allows a developer to specify the path or storage location of one or more development files, a code editor, a tool that allows a developer to allow/restrict access to application code to one or more developers, a tool that allows a developer to deploy resources necessary for the system at runtime, and a tool that allows a developer to launch a web server (if necessary) to test the application.

ADE 102 may categorize or group dev tools 110 based on the experience or skill level of the developer anticipated to use such a tool, such as simple or complex tools. For example, ADE 102 may include a set of expert (complex) dev tools 110 and a set of novice (simple) dev tools 110. En an embodiment, the novice dev tools 110 may include an abstraction, or combination of two or more of the expert dev tools 110. Conversely, in an embodiment, the expert dev tools 110 may include similar functionality as provided by one or more of the novice dev tools 110, and/or may include additional customizable features not provided with the novice dev tools 110. For example, a set of expert dev tools 110 may include the individual tools labeled edit, save, commit, configure repository, deploy, and start server. In continuing the example, the novice dev tools 110 may include only one tool 110 labeled run. The ran tool 110 may encompass the functionality provided by one or more of the expert dev tools 110, such as compiling, linking. In an embodiment, the run tool 110 may include additional functionality not included with the expert dev tools 110, such as code generation.

In an embodiment, upon entering a URL of ADE 102 (which may operate on one or more servers) a developer (who may need to login to the system) may be provided a configured template 106 for project view 104. However, based upon the provided project view 104, the developer may further customize project view 104 using tool selector 108.

Tool selector 108 may allow a developer to select which dev tools 110 the developer desires for project view 104. For example, in an embodiment, a novice developer may decide that they desire greater flexibility than only having a single "run" dev tool 110. Tool selector 108 may then provide the novice developer with more selectable dev tools 110 (e.g., such as the expert level dev tools 110) and the novice developer may select which additional dev tools 110 the developer desires to have as part of project view 104. The functionality of any remaining or unselected expert dev tools 110 may then remain encompassed within the "run" dev tool 110. Or, for example, tool selector 108 may extract any selected functionality from the "run" dev tool 110, and provide that functionality via the selected dev tools 110.

A developer who customizes project view 104 using tool selector 108 may save their selections as a customized template 106, and may be provided the customized template 106 upon their next login to ADE 102. Upon a selection of a template 106 and/or customization of which dev tools 110A-C are to appear on project view 104, a resource creator 109 may generate the code necessary to render project view 104 in browser 114. In an embodiment, the generated code may include Java, HTML, and/or other code that may be visually rendered in browser 114.

Resource creator 109 may include preconfigured code that may be customizable based on a user's selections via tool selector 108 and/or template 106. For example, a user may customize the visual appearance of a dev tool 110 (e.g., determining whether it appears as a button, as a menu item, its label, color, font, etc.), or whether it appears at all. In an embodiment, a user may combine the functionality of two or more dev tools 110 into a single dev tool 110, and have that single dev tool 110 with the combined functionality appear on project view 104. Based on the selections of the user, resource creator 109 may modify the code corresponding to the appearance and functionality of project view 104 and/or dev tools 110 to correspond to the user's preferences. Then for example, each time a particular user logs into ADE 102, the user may be provided the customized project view 104. When a user selects the visual representation or icon of a particular dev tool 110, browser 114 may transmit a message to ADE 102 that triggers the corresponding functionality of the selected dev tool 110.

In an embodiment, customized templates 106 may be provided to one or more other users. For example, a project lead or project manager may customize templates for various developers on an application development team. Then, when each developer logs into ADE 102, the developer may be provided the already customized template 106 for project view 104. The project lead or project manager may also restrict whether or which developers may further customize the template 106 using tool selector 108. For example, the project manager may prevent a particular developer from adding or removing particular dev tools 110.

A project servicer 112 may perform the actions or functionality of dev tools 110 within ADE 102. For example, project servicer 112 may include a compiler, linker, and other functionality commonly associated with application development. In an embodiment, project servicer 112 may include a mapping of the various available dev tools 110, and their corresponding functionality, such that project server 112 may prompt a developer if action is required to address an issue with the project view 104. Such an issue may include, for example, resolving a compiler error or correcting an incorrect path identifying the location a particular application file.

As previously noted, project view 104 may be configured based on the skill level of a developer. For example, a professional application developer may prefer to use a code editor to write code him/herself (e.g., as opposed to using a drag-and-drop or more visual platform), or otherwise have access to edit the code generated through a drag-and-drop platform. A business analyst, by contrast, who may not be as familiar with technology, but who may know the process of what he/she desires the application to do may be more comfortable with a drag-and-drop project editor of project view 104 that isolates the developer from development details, such as which programming language(s) are to be used. In an embodiment, such a business analyst may be able to visually manipulate and design a business process or program model using a drag-and-drop project view 104, which may then be translated into programming code by a code generator 116.

Code generator 116 may be a tool that is configured to translate business processes into one or more selected or configured programming languages. Code generator 116, in combination with project servicer 112, may perform all the associated steps of converting a specified business process into programming code and/or an executable application, including code generation, compiling, and linking processes.

ADE 102 allows the same project view 104 to be used across various programming languages or development or business processes, without requiring developers the need to learn or get accustomed to new project editors or development environments. As noted above, ADE 102 may operate in a client-server environment, in which ADE 102 may configure template 106 on a server, and provide the pre-configured template 106 to a developer who may be working from a client machine remotely across a network.

Figure 2:
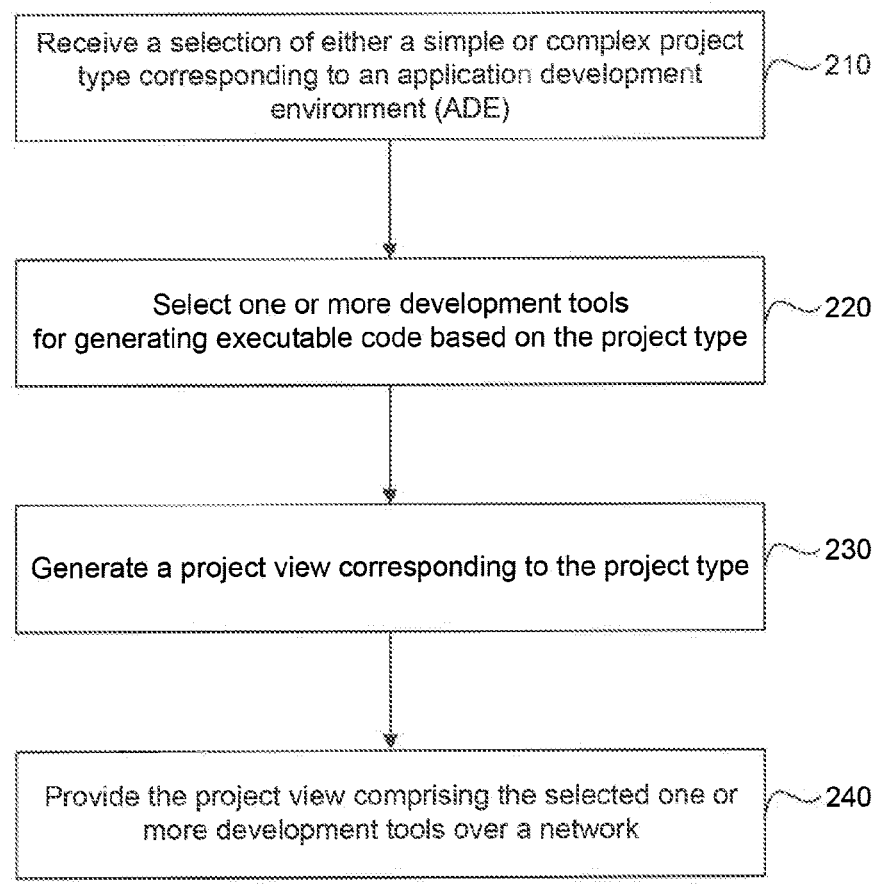
FIG. 2 is a flowchart illustrating a process for providing an adaptive application development environment (ADE), according to an example embodiment.

FIG. 2 is a flowchart illustrating a process 200 for providing an adaptive application development environment (ADE), according to an example embodiment.

At step or stage 210, a selection of either a simple or complex project type corresponding to an application development environment (ADE) is received. For example, ADE 102 may prompt a developer for a selection of a type of project view 104 the developer desires. The developer may select a simple or complex project type, or may select one of multiple templates 106 each of which may correspond to a varying level of complexity/simplicity. The complexity of a project type may, for example, be based on the number of tools/options available to a developer (e.g., where more available or rendered options or tools on project view 104 is considered more complex). Based on the selection by the developer, ADE 102 may select a corresponding template 106.

At stage 220, one or more of development tools for generating executable code based on the project type are selected. For example, tool selector 108 may select the dev tools 110 associated with the selected template 106. ADE 102 may then provide the selected dev tools 110 in project view 104. Dev tools 110 provided for a novice developer however may be fewer in number and/or including a combination of functionality of separately offered expert dev tools 110.

At stage 230, a project view corresponding to the project type is generated. For example, resource creator 109 may generate, customize, or adapt code corresponding to the selected/customized dev tools 110. The code may be executed by browser 114, which renders project view 104 of ADE 102 including an arrangement of the selected dev tools 110, which may be executed locally at a server on which ADE 102 may operate.

At stage 240, the project editor comprising the selected one or more development tools is provided over a network. For example, the server(s) of ADE 102 may provide the customized or configured project view 104 over a network for access by one or more developers at one or more client devices via browser 114.

EXAMPLE COMPUTER SYSTEM

Figure 3:
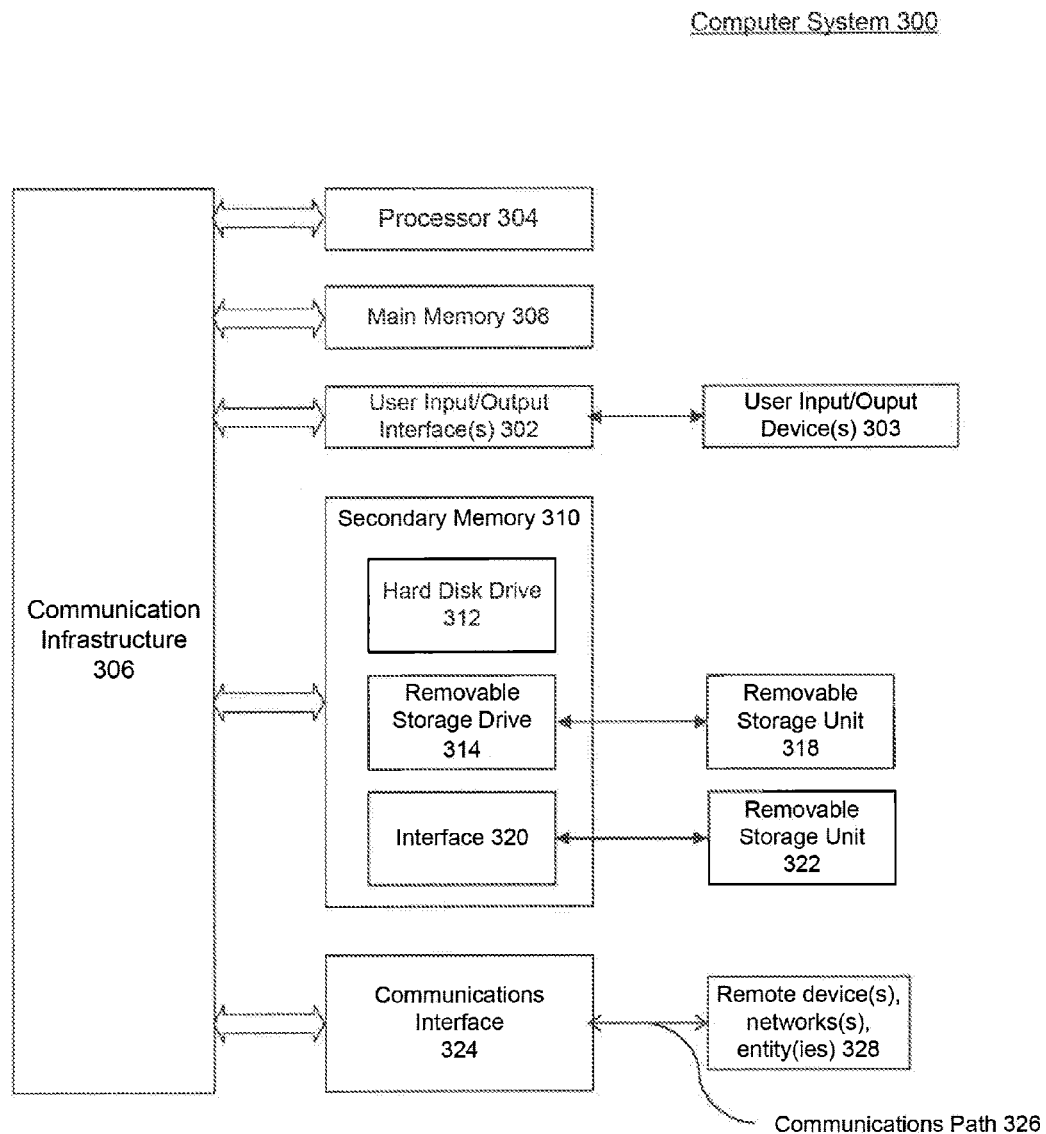
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein, such as computers available from International Business Machines, Apple, Sun, HP, Dell, Sony, Toshiba, etc.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 300 also includes user input/output device(s) 303, such as monitors, keyboards, pointing devices, etc., which communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 3. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (Whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or Characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising
determining an experience level of a developer for an application development environment (ADE);
configuring one or more development tools for generating executable code in the ADE based on the experience level, wherein two or more development tools are combined into a single tool if the experience level is novice, and wherein the two or more tools remain as individual uncombined tools if the experience level is expert;
generating a project view corresponding to the experience level, wherein the project view includes an arrangement of the configured development tools;
receiving an adjustment to the project view, wherein the adjustment indicates that the single tool is to be separated into two or more tools if the experience level is novice;
separating the single tool into a first tool and a second tool based on the adjustment, wherein the first tool comprises a first portion of functionality of the single tool, and the second tool comprises any remaining functionality of the single tool not separated into the first tool; and
providing the project view comprising the selected one or more development tools, over a network, and accessible to the developer.

2. The method of claim 1, wherein the generating comprises:
generating code corresponding to the selected one or more development tools for rendering in a browser.

3. The method of claim 1, further comprising:
receiving input via a project editor of the project view over the network, wherein the received input is program code.

4. The method of claim 1, further comprising:
receiving a selection of one of the development tools of the ADE in a browser; and
transmitting a message to a server, wherein the message corresponds to triggering functionality corresponding to the selected development tool on the server.

5. The method of claim 1, wherein the selecting comprises:
receiving a customization of a visual appearance of a selected development tool, wherein the customization is available to a first developer of a project with the expert experience level, but is restricted from a second developer of the project with the novice experience level.

6. The method of claim 5, wherein the generating comprises:
generating code corresponding to the customization of the visual appearance.

7. The method of claim 1, wherein the project view includes a project editor including drag and drop functionality for creating a program model, and wherein the ADE is configured to generate executable code corresponding to the program model.

8. A system, comprising:
a hardware processor comprising:
a project servicer configured to determine an experience level of a developer for an application development environment (ADE); and
a tool selector that configures one or more development tools for generating executable code in the ADE based on the experience level, wherein two or more development tools are combined into a single tool if the experience level is novice, and wherein the two or more tools remain as individual uncombined tools if the experience level is expert;
the project servicer further configured to:
select or generate a project view corresponding to the experience level, wherein the project view includes an arrangement of the selected development tools;
receive an adjustment to the project view, wherein the adjustment indicates that the single tool is to be separated into two or more tools if the experience level is novice;
separate the single tool into a first tool and a second tool based on the adjustment, wherein the first tool comprises a first portion of functionality of the single tool, and the second tool comprises any remaining functionality of the single tool not separated into the first tool; and
provide the project view comprising the selected one or more development tools, over a network, and accessible to the developer.

9. The system of claim 8, further comprising a code generator configured to:
generate code corresponding to the selected one or more development tools for rendering in a browser.

10. The system of claim 8, further comprising a code generator configured to:
receive input via a project editor of the project view over the network, wherein the received input is program code.

11. The system of claim 10, wherein
the project servicer is configured to receive a selection of one of the development tools; and
further comprising a resource creator configured to generate program code corresponding to the selected development tools, wherein a selection of the development tool within the project view corresponds to activating functionality associated with the selected development tool on a server.

12. The system of claim 8, wherein the tool selector is configured to receive a customization of a visual appearance of a selected development tool, wherein the customization is available to a first developer of a project with the expert experience level, but is restricted from a second developer of the project with the novice experience level.

13. The system of claim 12, wherein a resource creator generates code corresponding to the customization of the visual appearance.

14. The system of claim 8, wherein a project editor of the project view drag and drop functionality for creating a program model, and wherein a code generator is configured to generate executable code corresponding to the program model.

15. A tangible non-transitory computer-readable device having instructions stored thereon that, when executed by at least one computing device, causes the at least one computing device to perform operations comprising:

determining an experience level of a developer for an application development environment (ADE);
configuring one or more development tools for generating executable code in the ADE based on the experience level, wherein two or more development tools are combined into a single tool if the experience level is novice, and wherein the two or more tools remain as individual uncombined tools if the experience level is expert;
generating a project view corresponding to the experience level, wherein the project view includes an arrangement of the configured development tools;
receiving an adjustment to the project view, wherein the adjustment indicates that the single tool is to be separated into two or more tools if the experience level is novice;
separating the single tool into a first tool and a second tool based on the adjustment, wherein the first tool comprises a first portion of functionality of the single tool, and the second tool comprises any remaining functionality of the single tool not separated into the first tool; and
providing the project view comprising the selected one or more development tools, over a network, and accessible to the developer.

16. The computer-readable device of claim 15, the operations further comprising:
generating code corresponding to the selected one or more development tools for rendering in a browser.

17. The computer-readable device of claim 15, the operations further comprising:
receiving input via a project editor of the project view over the network, wherein the received input is program code.

18. The computer-readable device of claim 17, the operations further comprising:
receiving a selection of one of the development tools of the ADE in a browser; and
transmitting a message to a server, wherein the message corresponds to triggering functionality corresponding to the selected development tool on the server.

19. The computer-readable device of claim 15, wherein the selecting comprises:
receiving a customization of a visual appearance of a selected development tool, wherein the customization is available to a first developer of a project with the expert experience level, but is restricted from a second developer of the project with the novice experience level.

20. The computer-readable device of claim 19, wherein generating comprises:
generating code corresponding to the customization of the visual appearance.

21. The method of claim 1, wherein the provided project view comprises a first project view, the method further comprising:
providing a second project view comprising the selected one or more development tools, over a network, and accessible to the developer, wherein the second project view is associated with a second programming language different from a first programming language associated with the first project view, and wherein the first project view and the second project view visually appear the same.

* * * * *